Jan. 3, 1939.　　　A. W. CARPENTER　　　2,142,493
MOTION PICTURE APPARATUS
Filed April 20, 1936　　　4 Sheets-Sheet 1

INVENTOR
ARTHUR W. CARPENTER
BY W. E. Beatty
ATTORNEY

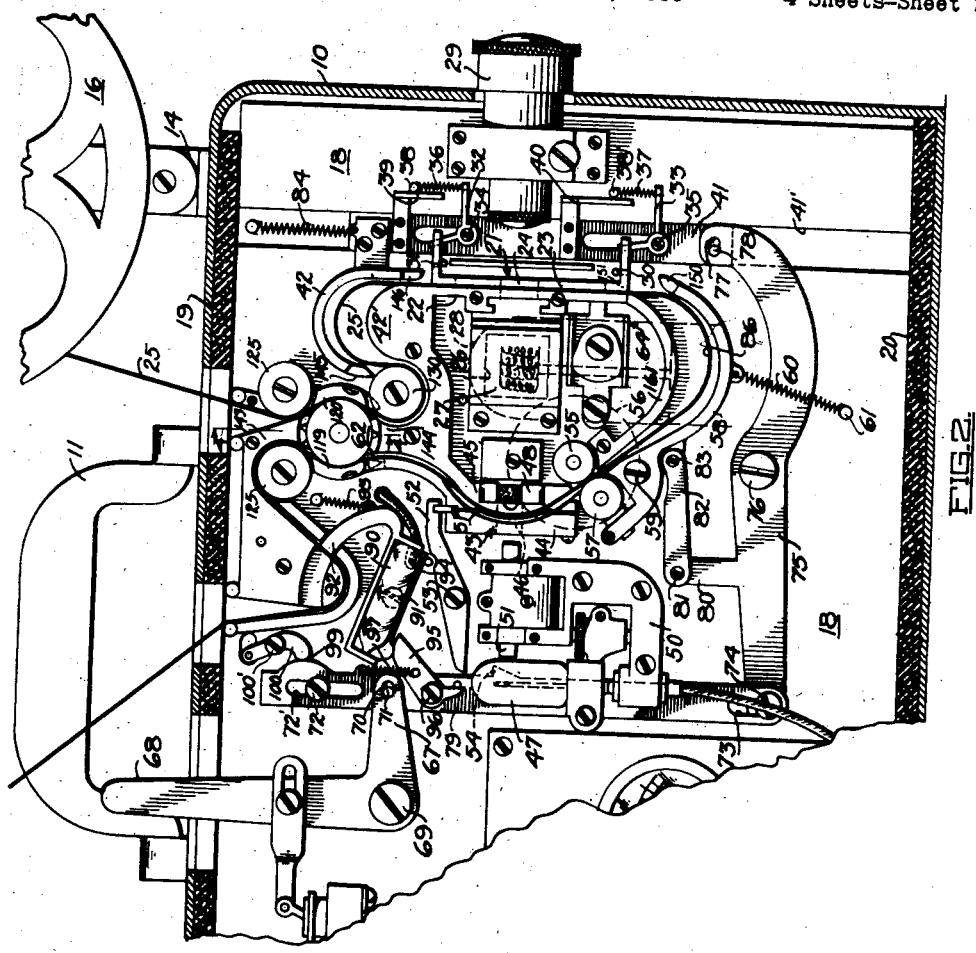

Jan. 3, 1939.  A. W. CARPENTER  2,142,493
MOTION PICTURE APPARATUS
Filed April 20, 1936   4 Sheets-Sheet 3

INVENTOR.
ARTHUR W. CARPENTER
BY W. E. Beatty
ATTORNEY

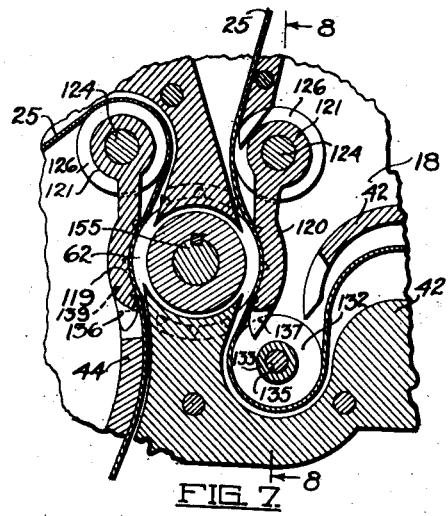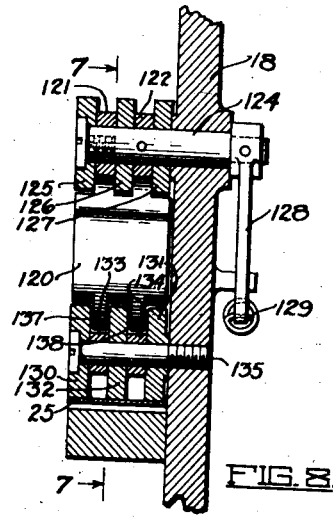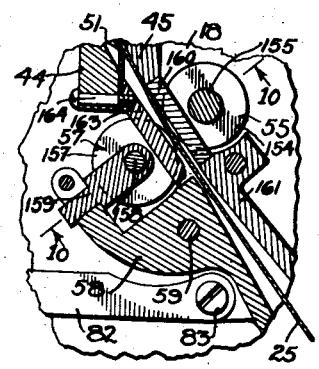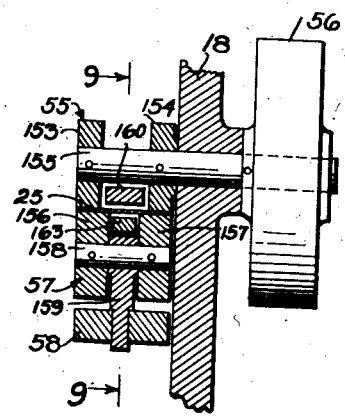

Patented Jan. 3, 1939

2,142,493

UNITED STATES PATENT OFFICE 2,142,493

MOTION PICTURE APPARATUS

Arthur W. Carpenter, Hollywood, Calif., assignor to United Research Corporation, Burbank, Calif., a corporation of Delaware Application April 20, 1936, Serial No. 75,345

6 Claims. (Cl. 88—17)

This invention relates to motion picture apparatus and more particularly to automatic film threading arrangements for guiding a motion picture film through the various mechanisms of a motion picture device.

In the past few years, motion picture cameras, projectors and other similar apparatus have been developed to incorporate self threading features whereby the film used therein may be automatically threaded through the apparatus without the aid of the operator. These automatic threading arrangements have particular value when used in portable sub-standard cameras and projectors usually employed by amateur operators who desire to devote a minimum amount of time and effort to the operation of the machine.

In general, automatic threading arrangements of the type referred to require film guiding means for guiding the forward or leading edge of the film to and from the various sprockets, film gate, and sound gate in the case of a talking picture device, etc. Further, a portion of the film guiding means is generally movable into two positions so as to form a loop in the film in one position, and when threading, and in another position to allow the loop to expand or contract so as to compensate for a change in motion of the film from a constant motion to an intermittent motion required to project the motion pictures carried by the film.

The leading edge of the film which may at times be ragged or uneven, has a tendency to curl and thus catch between the various guiding means or between the guiding means and the various sprockets, picture gate, sound gate, etc.

One object of the present invention is to obviate the above mentioned difficulties.

This is accomplished by providing interdigitating or interlocking projections on the ends of adjacent film guiding members so as to present an uninterrupted passage for the leading end of a film while being fed lengthwise through the film guiding members. Preferably a number of spaced projections are provided on the ends of the various adjacent guide members to prevent ragged edged films from catching between adjacent ends of the guiding members.

More particularly describing the invention, reference is to be had to the accompanying drawings, wherein:

Fig. 2 is a sectional view similar to Fig. 1, with parts broken off, showing the actuating mechanism in "still" position.

Fig. 3 is a perspective view showing the interdigitating projections on the ends of a loop forming member.

Fig. 4 is a sectional view of the drive sprocket and adjacent film guides and is taken along the line 4—4 of Fig. 2.

Fig. 7 is a sectional elevational view through the drive sprocket and its adjacent pad members, and is taken along the line 7—7 of Fig. 8.

Fig. 8 is a sectional view taken along the line 8—8 of Fig. 7, showing the interdigitating projections of the pad members.

Fig. 9 is a sectional view through the fly-wheel roller and its accompanying spring pressed pad roller, and is taken along the line 9—9 of Fig. 10.

Fig. 10 is a transverse sectional view taken along the line 10—10 of Fig. 9.

Attention is called to the co-pending applications of Ernest Ross, Serial No. 744,947, filed September 21, 1934, and Serial No. 31,546, filed July 16, 1935, which disclose and claim several features of the projector illustrated and described herein, such as the intermittent movement, driving connections, and general arrangement of parts.

The present invention is illustrated as being embodied in a portable home talking picture projector, but it is to be understood that the invention is not limited to use therewith but may be applied to any film handling apparatus, particularly of the automatic threading type.

Figure 1:
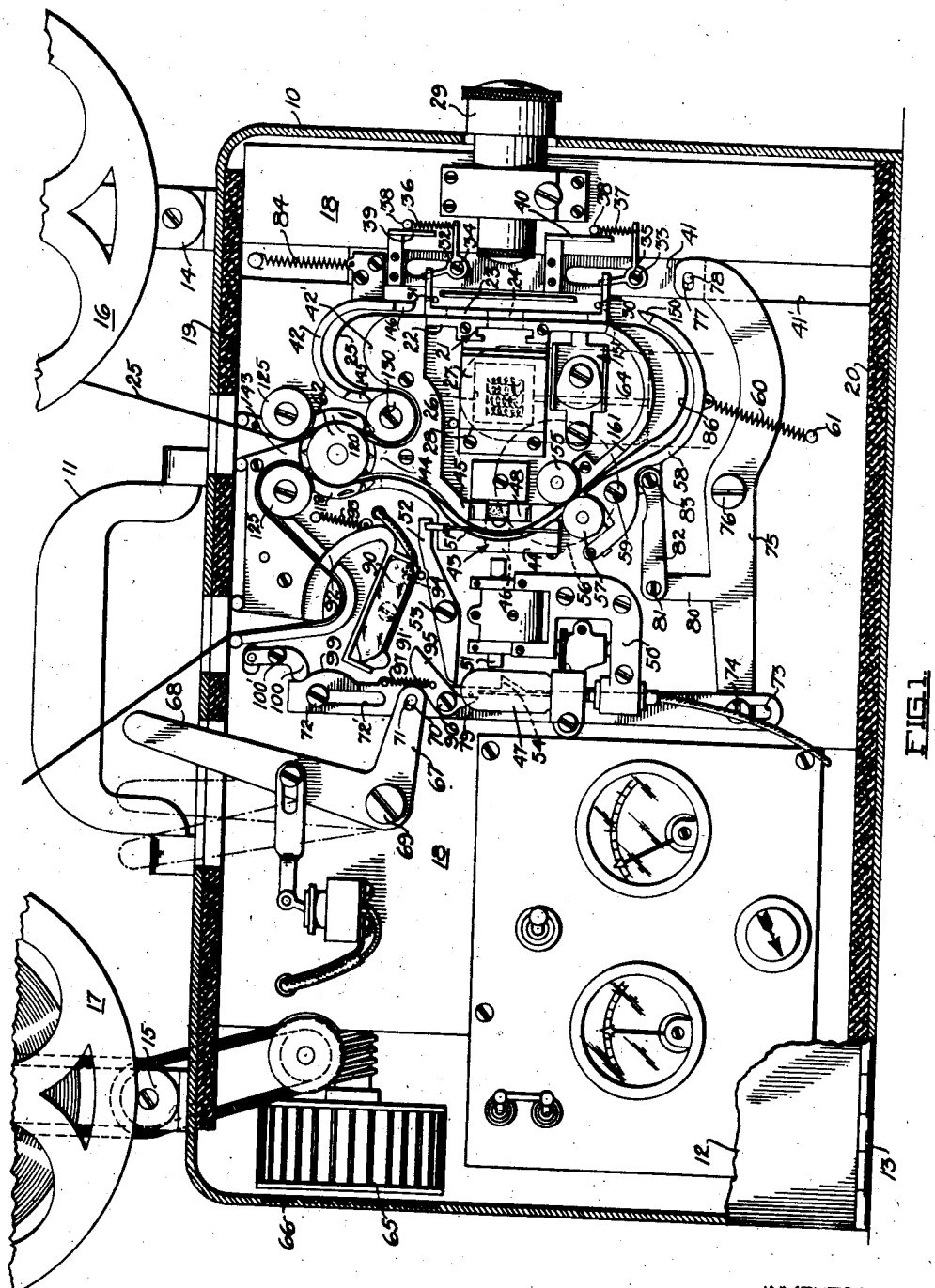
Fig. 1 is a sectional elevational view of a portable talking picture projector embodying my invention and showing the actuating parts in "running" position.

Referring to Fig. 1, the combined picture projector and sound reproducer is shown as being enclosed within a casing 10, having a handle 11 for carrying purposes. A cover partially illustrated at 12 is hingely supported at 13 on the side of casing 10 to allow access to the interior of the projector. Reel supporting standards 14 and 15 are provided on the upper surface of casing 10 to carry supply and take-up reels 16 and 17, respectively.

In order to facilitate assembly of the projecting mechanism and also to simplify the arrangement of the various parts, most of the mechanism is mounted upon a vertical wall 18 which, in turn, is supported within the casing 10 by pads 19 and 20 of resilient material, such as sponge rubber. This resilient material prevents contact of the plate 18 with the casing 10 and thus serves to absorb vibration and sound produced by the various moving parts of the projector.

The picture projection gate, generally indicated at 21, comprises a stationary aperture plate 22 and a movable aperture plate 23. An aperture indicated by the dotted lines 24 extends through both plates 22 and 23. A projection lamp 28 on the rear side of wall 18 is provided to project a beam of light through an enlarged aperture, indicated by the dotted lines 26, onto a mirror 27 disposed at 45° to the wall 18. From mirror 18 the light is reflected through aperture 24 in plate 22 and onto a film 25 passing through the picture gate. An objective lens 29 is provided to focus the illuminated film on a suitable motion picture screen (not shown). The aperture plate 23 is movably supported upon pins 30 and 31 extending from wall 18 and is engaged at either end by a pair of bell crank levers 32 and 33 having their upwardly projecting arms extending through slots therein. Levers 32 and 33 are pivotally supported on the wall 18 at 34 and 35 respectively. Springs 36 and 37 are secured between the outer ends of levers 32 and 33 and pins 38 and 38', respectively, projecting from the wall 18 to resiliently urge the movable plate 23 against film 25 in the picture gate 21. Plate 23 is movable outwardly, for the purpose of threading film through the picture gate 21, by means of a pair of fingers 39 and 40. These fingers are attached to a vertical movable bar 41, slideable within a groove 41' formed in wall 18 and are adapted, in one position of bar 41, to engage and depress the horizontally extending arms of levers 32 and 33. Also attached to the bar 41 at its upper end is a loop former 42 which is semi-circular in shape.

The sound gate generally indicated at 43 comprises a pair of stationary film guiding members 44 and 45 secured to the wall 18 and forming a film passage therebetween. An aperture 46 extending horizontally through the members 44 and 45 allows a light beam projected by an exciter lamp 47 to pass through the sound track portion of the film and be impressed upon a selenium cell 48, or other suitable photo-electric device situated in a recess formed at the back of the guide member 45. Lamp 47 is adjustably supported upon a bracket 50 which also carries a tube 51 containing a lens and slit combination through which light from the exciter lamp 47 passes and is projected upon the sound track of the film 25 in the form of a fine horizontal line of light. In order to prevent the film from fluttering as it passes the sound translation point in sound gate 43, the film is kept in close contact with the forward surface of member 45 by means of springs, one of which is shown at 51'. Springs 51' are secured at their lower ends to the guide member 44 and are engaged at their upper ends by a lever 52. Lever 52 is pivotally supported at 53 on wall 18 and is adapted to be engaged at its free end by a projection 54 formed on a second vertical movable rod 79.

As a further precaution to prevent fluctuation of the film while passing the sound translation point, a roller 55 is provided below the sound gate 43 and has attached thereto a fly-wheel indicated by the dotted lines 56. A second roller 57, freely rotatable on a loop former lever 58, is provided adjacent roller 55. Lever 58 is pivotally supported at 59 on wall 18 and is connected at one end to a spring 60, the other end of which is secured to a pin 61 projecting from the wall 18. Thus, it will be seen that lever 58 resiliently urges the roller 57 against the fly-wheel roller 55 or against a film passing therebetween. The free end of lever 58 is shown as being semi-circular in shape and constitutes a loop former for the film passing from the picture gate 21.

A single drive sprocket 62 is provided which acts both as a supply and a take-up sprocket for a film passing through the projector. Sprocket 62 is driven through a suitable connection (not shown) by means of a motor diagrammatically indicated at 63 in Fig. 6. This motor 63 also drives an intermittent movement 64 directly below the picture gate 21 through a suitable connection (not shown). A ventilating system comprising a plurality of centrifugal fans, one of which is shown at 65, (Fig. 1) is provided to draw in air through an aperture 66 in the rear of the casing 10 and circulate it about the projection lamp 28 and the adjacent mechanism. The fans 65, etc., are also driven by motor 63 through suitable direct connections (not shown).

Figure 5:
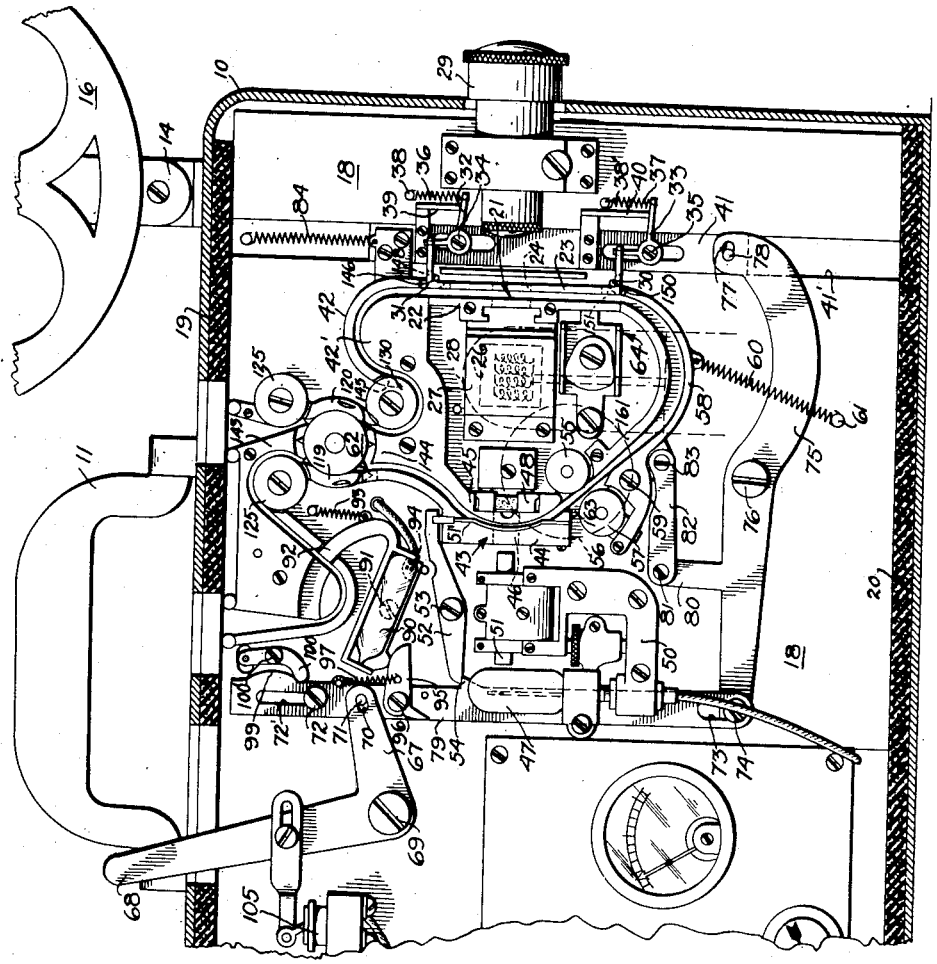
Fig. 5 is a sectional view through the projector, similar to that of Fig. 1, with parts broken away, showing the actuating mechanism in "threading" position.

The projector is adapted to be set in any one of three different positions, i. e. "running", "still" and "threading", as illustrated in Figs. 1, 2 and 5, respectively. An operating lever 68 is provided to set the projector in any one of the three mentioned positions. Lever 68 is in the shape of a bell crank and is pivotally secured by means of a screw 69 to the wall 18. The horizontally extending arm 67 of lever 68 has an elongated slot 70 which engages a pin 71 provided on the vertically extending bar 79. Bar 79 is guided at its upper end by means of a pin or screw 72 extending from wall 18 and projecting within a vertically extending elongated slot 72' formed in the bar 79. A second elongated slot 73 on the lower portion of bar 79 is engaged by a screw 74 secured to one end of a loop former actuating lever 75. Lever 75 is pivotally supported by means of a screw 76 upon the wall 18 and has an elongated slot 77 at its opposite end which engages a pin 78 provided on the lower end of the vertically extending bar 41. An upwardly extending projection 80 on the lever 75 has pivotally secured thereto, at 81, one end of a link 82. The other end of link 82 is pivotally secured at 83 to the combined lever and loop former 58. When the lever 68 is thrown forward into a "running" position, as indicated in Fig. 1, the vertical bar 79 is moved to its lowermost position which in turn rotates the lever 75 in a counterclockwise direction so as to allow the vertical bar 41 at the forward end of the projector to be moved upwardly by means of a spring 84 provided between a pin projecting from wall 18 and the upper end of bar 41. This movement of bar 41 allows the springs 36 and 37 to resiliently urge the movable aperture plate 23 against the film 25 in the picture gate 21 and also allows the upper loop former 42 to be moved upwardly away from a juxtaposed stationary loop former section 42' to permit the loop formed in the film 25 to expand and contract due to the change in motion from constant speed to intermittent speed required for projection of moving pictures. Also the counter-clockwise movement of lever 75 allows the spring 60 attached between the loop former 58 and a pin 61 to withdraw the same downwardly so as to permit a loop 86 formed in the film 25, directly below the picture gate 21, to expand and contract. When the loop former 58 is in this position the roller 57 is resiliently urged against a film passing between the flywheel roller 55 and roller 57.

When the lever 68 is retracted to its extreme rearward position, as shown in Fig. 5, for the threading operation, the bar 79 is raised upwardly causing the other vertical bar 41 to be drawn downward through the action of lever 75. This movement closes the loop formers 42 and 58 for the forming of the speed variation compensating film loops before and after the film gate 21, and also opens the film gate 21 to allow the film to be threaded therethrough. Simultaneously with the closing of loop former 58 the presser roller 57 is retracted from engagement with the flywheel roller 55 so as to permit threading of the film between these two rollers. The springs 51 in sound gate 43 are bowed, during this operation, through the action of the projection 54 on bar 79 engaging lever 52. This bowing of springs 51 provides a sufficient space between the front surfaces thereof and the film guiding surface of the stationary member 45 to allow the leading edge of the film to be threaded therebetween with a minimum amount of friction.

A safety device 90 is provided adjacent the film path directly behind the drive sprocket 62 to engage the film after it passes on its way to the take-up reel 17 from the sprocket 62. This device comprises a mercury switch which is pivotally mounted on the wall 18 as at 91. Arms 92, coacting with the switch 90 are adapted, when the projector is in "running" or "still" position, to engage the surface of the film at either edge thereof. A spring 93 is provided to retract the switch 90 so as to break a contact 94 therein when the film in the projector breaks or when the end of the film passes the arms 92. This action of the switch 90 stops the motor in a manner described hereinafter.

A lever 95 pivotally mounted at 96 to the rear vertical bar 79 has a spring 97 connected thereto to urge it upwardly. When bar 79 is raised to its upward position, during the threading operation, this lever 95 engages and moves the switch 90 to remove the arms 92 from the film passage so as to allow the leading edge of the film to pass thereby.

In the "still" position, the lever 68 is positioned intermediate its "threading" and "running" positions as indicated in Fig. 2. The loop formers 42 and 58 as well as the film gates 21 and 43 are allowed to remain in the same positions which they occupied in the "running" position. That is to say, that when moving the lever 68 from its "running" to "still" position, the lever 75 is undisturbed due to the elongated slot 73 on the bottom portion of bar 55 which allows for a certain upward movement of bar 79 before engaging the lever 75. However, movement of the bar 79 upwardly through this action causes a cam surface 99 formed at the upper end thereof to engage and rotate in a counter-clockwise direction a motor clutch operating lever 100. Lever 100 is pivoted to the wall 18 at 100' and is connected at its upper end through a suitable link mechanism (not shown) to a motor clutch (not shown). This motor clutch is connected between the projector motor 63 (Fig. 6) and both the drive sprocket 62 and the intermittent movement 64. When in "still" position, as shown in Fig. 2, the motor clutch is thrown out of engagement so as to allow the sprocket 62 and movement 64 to stop, thus allowing for "still" projection of any desired picture frame in the film 25.

Figure 6:
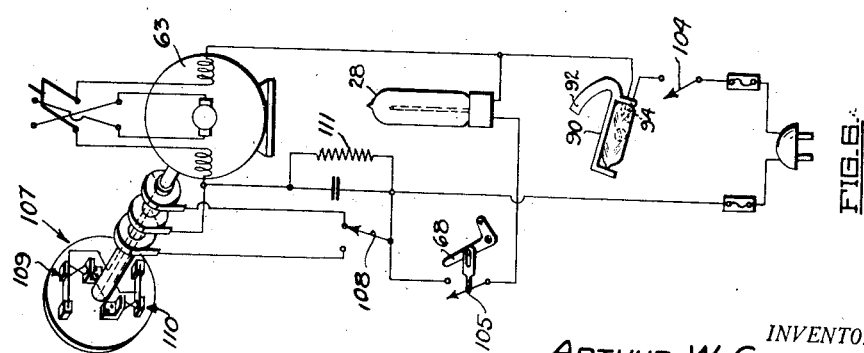
Fig. 6 is a diagrammatic view showing the electrical circuit for the projector.

Referring to Fig. 6 which illustrates a circuit diagram of the projector, the motor 63 is connected in series with a master switch 104, the safety switch 90, and a resistance 111. The projector lamp 28 is connected in parallel across the motor circuit and has provided in series therewith a switch 105 adapted to be operated by the lever 68. The purpose of switch 105 is to open the projection lamp circuit during the "threading" operation and to close it during both the "running" and "still" operation.

As is well known, 16 mm. silent film is generally run at 16 frames per second, while the 16 mm. sound film is run at 24 frames per second. While the herein described projector is especially designed for sound film, it may be desirable at times to project silent film. To accomplish this result, I employ a two speed change-over control 107 which is adapted to selectively control the motor 63 at either of two predetermined speeds, corresponding to the speeds required for both the silent and sound films. The change-over control 107 comprises a pair of centrifugally operated switches 109 and 110, operatively connected to motor 63, each of which is set to open at a speed corresponding to either silent picture projection speed or sound picture projection speed. These two switches are so arranged that they may be selectively placed in parallel across the resistance 111 by means of a switch 108.

I will now describe the interdigitating projections provided on adjacent ends of the various film guiding members and forming the main embodiment of this invention. Referring to Figs. 7 and 8, the film drive sprocket 62 has provided on either side thereof, a pair of presser pads 119 and 120 pivotally supported to the wall 18 as follows; the upper end of each of pads 119 and 120 have projections 121 and 122 through which a laterally extending hole is provided. A stud 124 extends through this hole in projections 121 and 122 and is journaled in the wall 18 to form a pivotal bearing for each of the pads 119 and 120. A set of spaced disc members 125, 126 and 127 interposed between the projections 121 and 122, and on either side thereof, have co-axial holes therein through which is passed the stud 124. These discs 125 to 127, inclusive, form a film guiding surface for the film 25 passing thereover to or from the drive sprocket 62. In this case, each stud 124 is connected by means of an arm 128 (Fig. 8) to a spring 129 for the purpose of urging the presser pads 119 and 120 toward the drive sprocket 62.

Situated adjacent the lower end of presser pad 120 is a second set of co-axially spaced discs 130, 131 and 132, forming a guiding member for film 25. A pair of washers or spacers 133 and 134 are provided to hold the discs 130 to 132, inclusive, in space relation with each other. This assembly is secured to wall 18 by means of a bolt 135 extending axially therethrough and threaded in the wall 18. A pair of projections 137 and 138 are formed on the lower end of the presser pad 120. These projections interengage or interdigitate with the discs 130 and 132, inclusive, so as to provide an uninterrupted film passage for the leading end of the film 25 while being threaded through the projector and thus prevent this leading edge from catching between the sprocket 62 and this lower cylindrical film guide assembly. Presser pad 119 also has projections 136 extending downwardly therefrom which interlock or interengage with mating upwardly extending projections 139 formed on the stationary film guide 44.

Referring now to Fig. 4, the sprocket 62 has a plurality of circumferential grooves 140, 141, and 142 therein, into which projections 140', 141' and 142', on a stationary film guide 143 above the sprocket 62 extend. Grooves 140, 141, and 142, also receive projections 140'', 141'' and 142'' extending upwardly from a stationary film guide 144 below the sprocket 62. These interdigitations between guides 143 and 144, and sprocket 62, prevent the leading edge of the film from catching therebetween.

Referring now to Fig. 3, the semi-circular loop former 42 is also shown as having projections 145 and 145' on the rear end thereof. The projections 145 and 145' are adapted, when the projector is in threading position, as in Fig. 5, to extend within the interspaces between discs 130 to 132, respectively. The forward projections 146 and 146' on loop former 42 are adapted, in threading position, to extend within slots 148 and 149 formed in the upper end portion of the movable aperture plate 23, thus preventing the leading edge of the film 25 from catching or sticking between the loop former 42 and the aperture plate 23, while being threaded therepast.

As indicated in Figs. 1 and 5, the lower loop former 58 has similar projections 150 on the upper end thereof which are adapted to interengage with and extend through slots 151 (similar to those at 148 and 149) in the lower end portion of the movable aperture plate 23, in threading position.

Although, in the above mentioned interdigitating connections, only two or three projections have been provided on each member, it is to be understood, that any number of projections may be employed. It should further be understood that the greater the number of projections employed on each adjacent member, the smaller will be the chance of the leading edge of the film catching in the crevices formed between those adjacent members.

Referring now to Figs. 9 and 10, I will now describe the means for preventing the film from catching or sticking between the two rollers 55 and 57 and their adjacent film guiding members. As shown in Fig. 10, the fly-wheel roller 55 comprises a pair of spaced roller elements 153 and 154. These two elements are both secured upon a fly-wheel roller shaft 155 carrying the fly-wheel 56 at its opposite end. The pressure roller 57 also comprises a pair of spaced roller elements 156 and 157 secured upon a stub shaft 158. Shaft 158 is journaled within a bearing 159 extending from the loop former member 58. A small bridging piece 160 is secured between the stationary guide 45, above roller 55, and a second stationary film guide member 161, positioned below the roller 55. This member 160 extends within the interspace between roller elements 153 and 154 and lies slightly below the surface of the portion of film 25 passing tangentially over the roller. A second bridging piece 163 is secured to the lower end of stationary member 44 as by a screw 164. This member 163 extends through the interspace between roller elements 156 and 157, slightly below the portion of the surface thereof which engages the film 25, and has its free end lying closely adjacent the loop former member 58.

Thus the leading end of the film, as it is being threaded through the projector, will be guided to and from engagement with rollers 55 and 57 without the possibility of it catching therebetween.

Although the interdigitating or interengaging projections of the film guiding means, which constitutes the pertinent part of the present invention is described and illustrated in conjunction with a motion picture projector, it is to be understood that these interdigitated projections may be employed in any motion picture apparatus without departing from the spirit of the invention.

Having thus described the invention, what is claimed as new and desired to secure by Letters Patent, is:

1. In a motion picture apparatus, film guiding means comprising a plurality of spaced discs coaxial with each other to provide a film guiding surface, a film guiding member adjacent said discs, said member having projections on one end thereof adapted to extend within the interspaces between said discs to provide an uninterrupted film passage for the leading end of a film between said discs and said member, and a second plurality of spaced discs co-axial with each other, said film guiding member being pivoted co-axially with said second plurality of spaced discs and having projections interdigitating with said second plurality of discs.

2. In a motion picture apparatus, a plurality of co-axially spaced disc members forming a film guiding surface, a film guiding member adjacent said disc members and having projections extending into the interspaces between said disc members, said projections being pivotally supported at a point substantially concentric with the axes of said disc members.

3. In a motion picture apparatus a drive sprocket for feeding film to said apparatus at one side thereof and taking film from said apparatus on the other side thereof, a plurality of film guiding discs disposed to guide said film onto said sprocket and away from said sprocket, and a plurality of pressure pads on opposite sides of said sprocket adapted to maintain said film thereon, said pressure pads having projections at the extremities thereof adapted to interdigitate with certain of said film guiding discs.

4. Automatic film threading apparatus comprising a film passage, means for propelling the free end of a film through said passage, a portion of one side of said passage comprising two relatively movable walls adapted in one position to abut, and interdigitated film guiding projections on the adjacent ends of said walls to prevent the leading edge of a film from catching on the joint between said wall portions when abutted, one of said movable walls comprising a loop former, a grooved guide roller associated therewith, and stripping fingers on said loop former cooperating with said grooved guide roller.

5. Automatic film threading apparatus comprising an arcuate loop former having a plurality of laterally spaced film guiding projections at each end thereof, means for rectilinearly moving said loop former, a wall member having a plurality of recesses adapted to receive the projections at one end of said loop former, and a guide roller having a plurality of grooves adapted to receive the projections at the other end of said loop former, whereby said loop former is adapted to strip the leading end of a film from said guide roller and lead the same past the joint between said loop former and said wall member.

6. Automatic film threading apparatus comprising a film gate, a loop former above said gate, means for supporting said loop former for movement in a straight line, a second loop former below said gate, means for supporting said second loop former for pivotal movement, common means for operating both of said loop formers, and interdigitated film guiding projections on one end of each of said loop formers and on said gate.

ARTHUR W. CARPENTER.